July 25, 1939.  B. N. FOSTER ET AL  2,167,401

MACHINE TOOL WITH FEEDING MECHANISM

Filed Jan. 6, 1937  11 Sheets-Sheet 1

Inventor
Benjamin N. Foster,
& Edward J. Kingsbury,
By
Mason & Porter
Attorneys

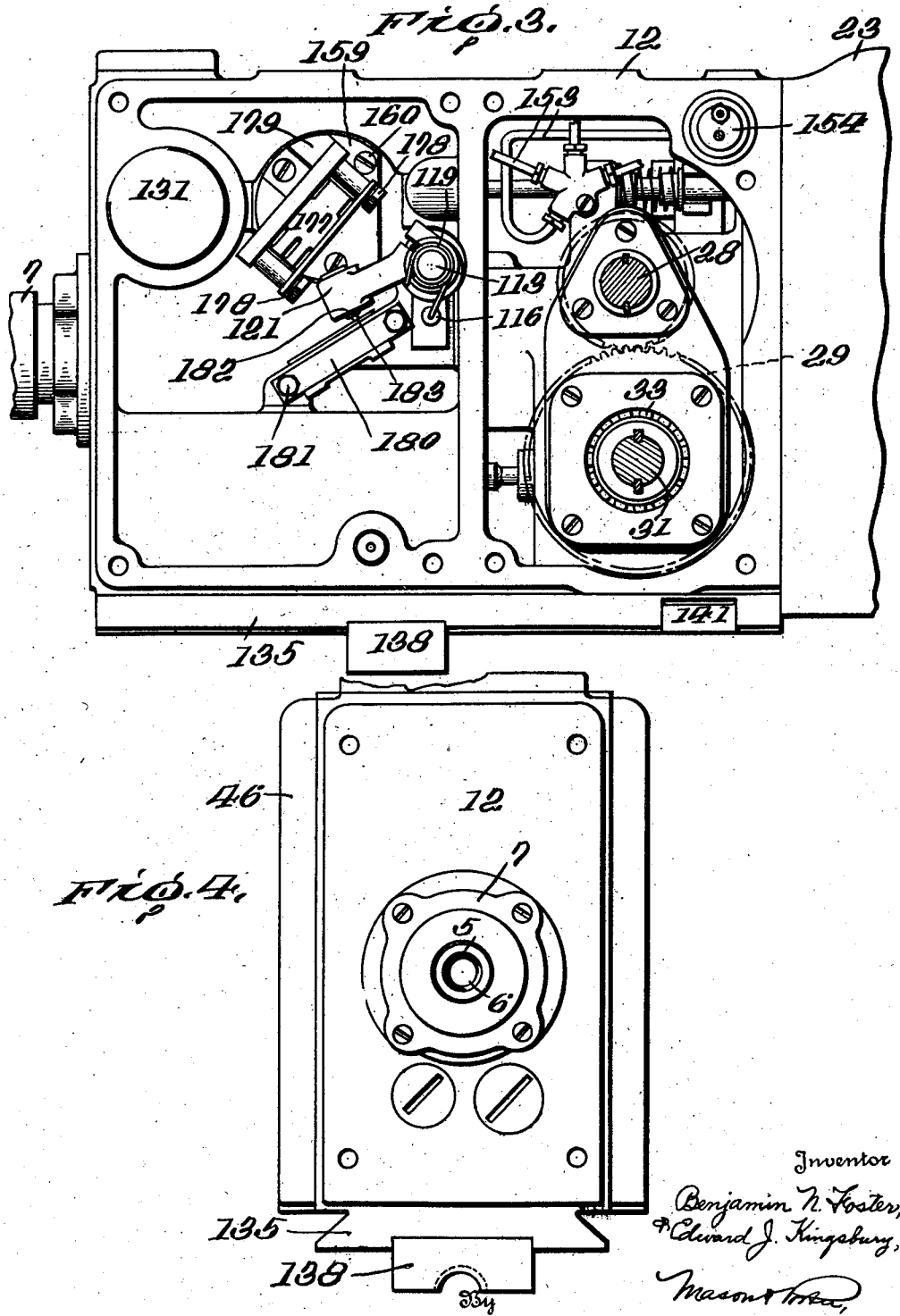

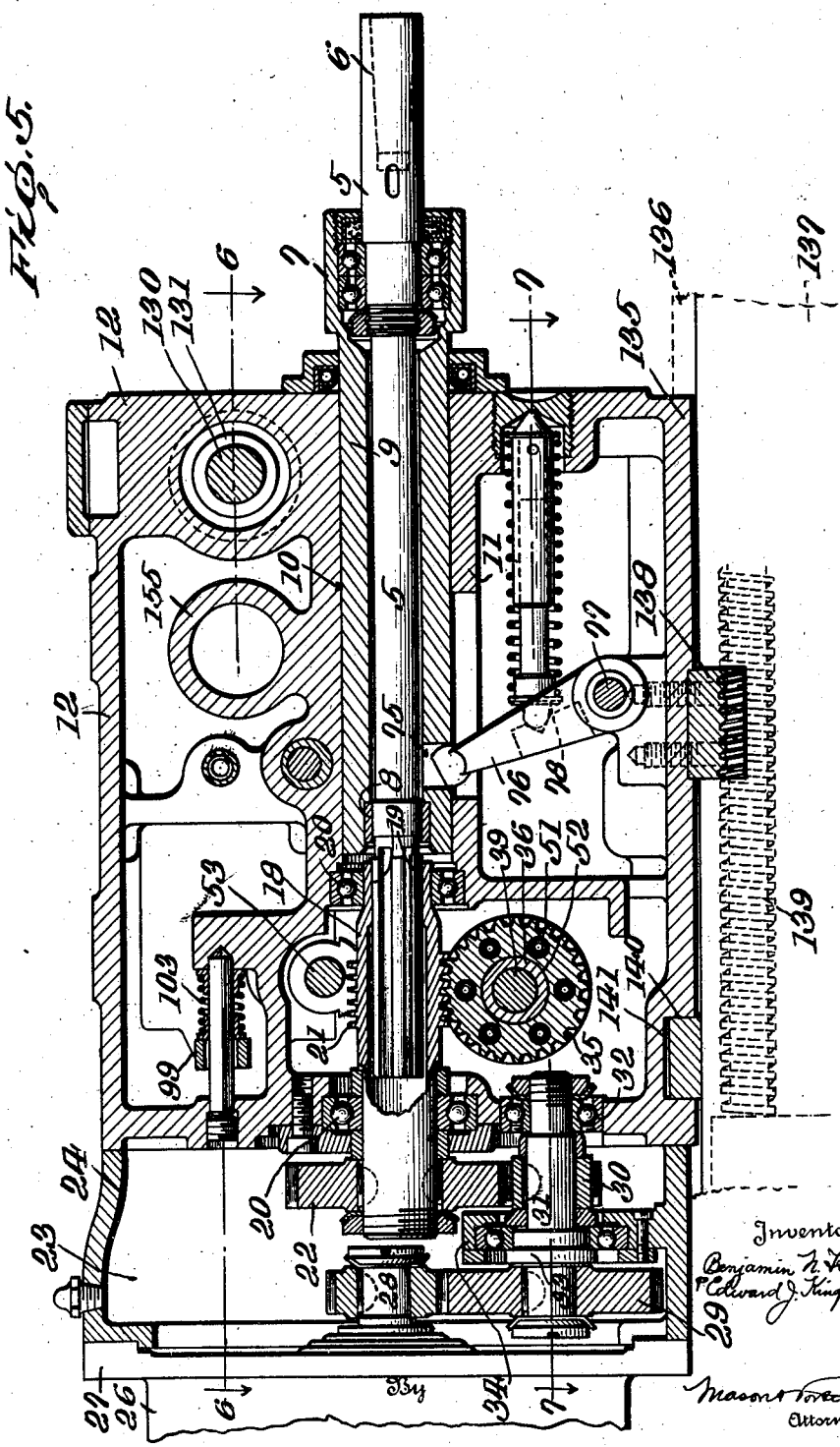

July 25, 1939.    B. N. FOSTER ET AL    2,167,401
MACHINE TOOL WITH FEEDING MECHANISM
Filed Jan. 6, 1937    11 Sheets-Sheet 4
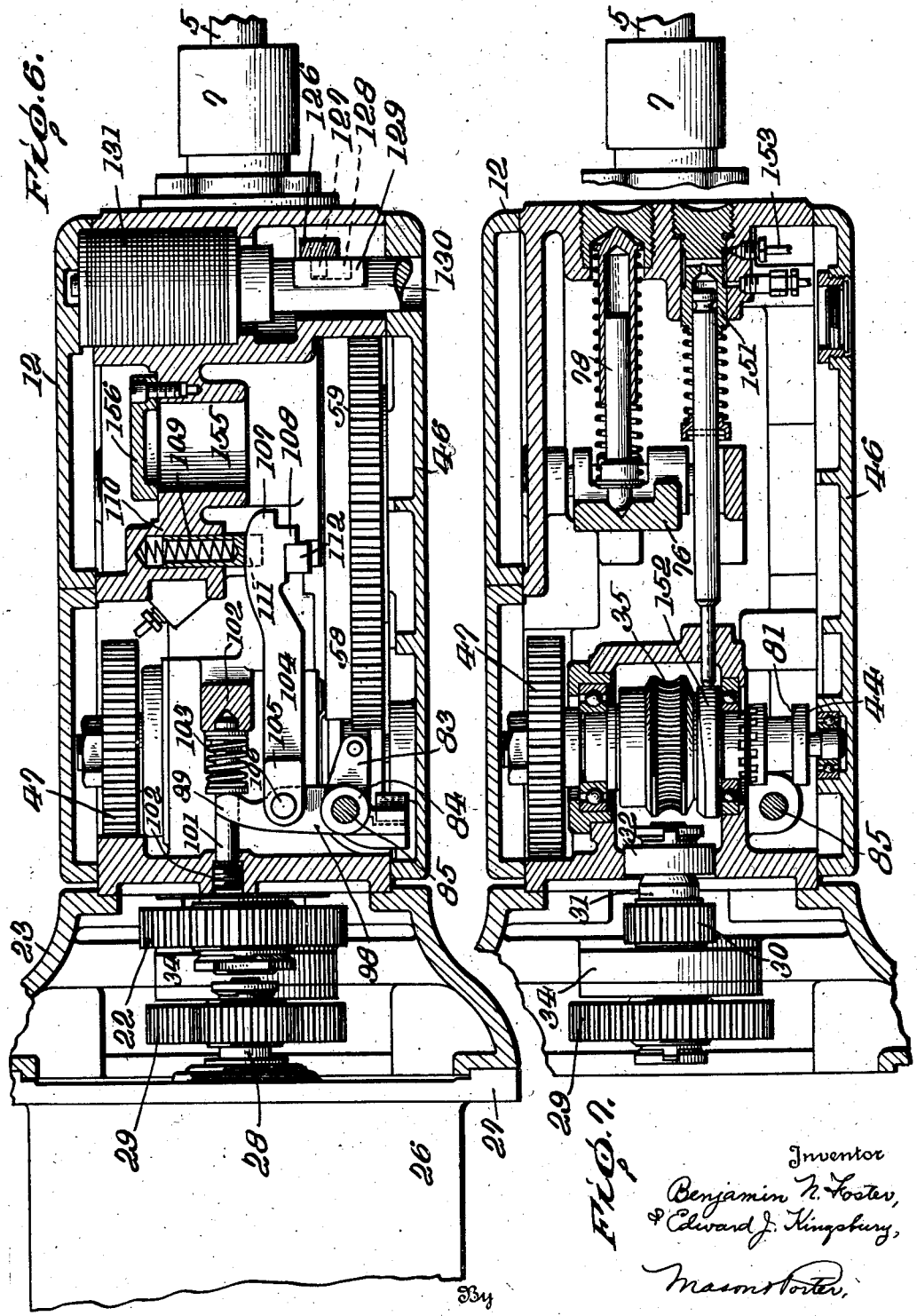
Inventor
Benjamin N. Foster,
& Edward J. Kingsbury,
Mason Foster,
By
Attorneys July 25, 1939.  B. N. FOSTER ET AL  2,167,401
MACHINE TOOL WITH FEEDING MECHANISM
Filed Jan. 6, 1937   11 Sheets-Sheet 5
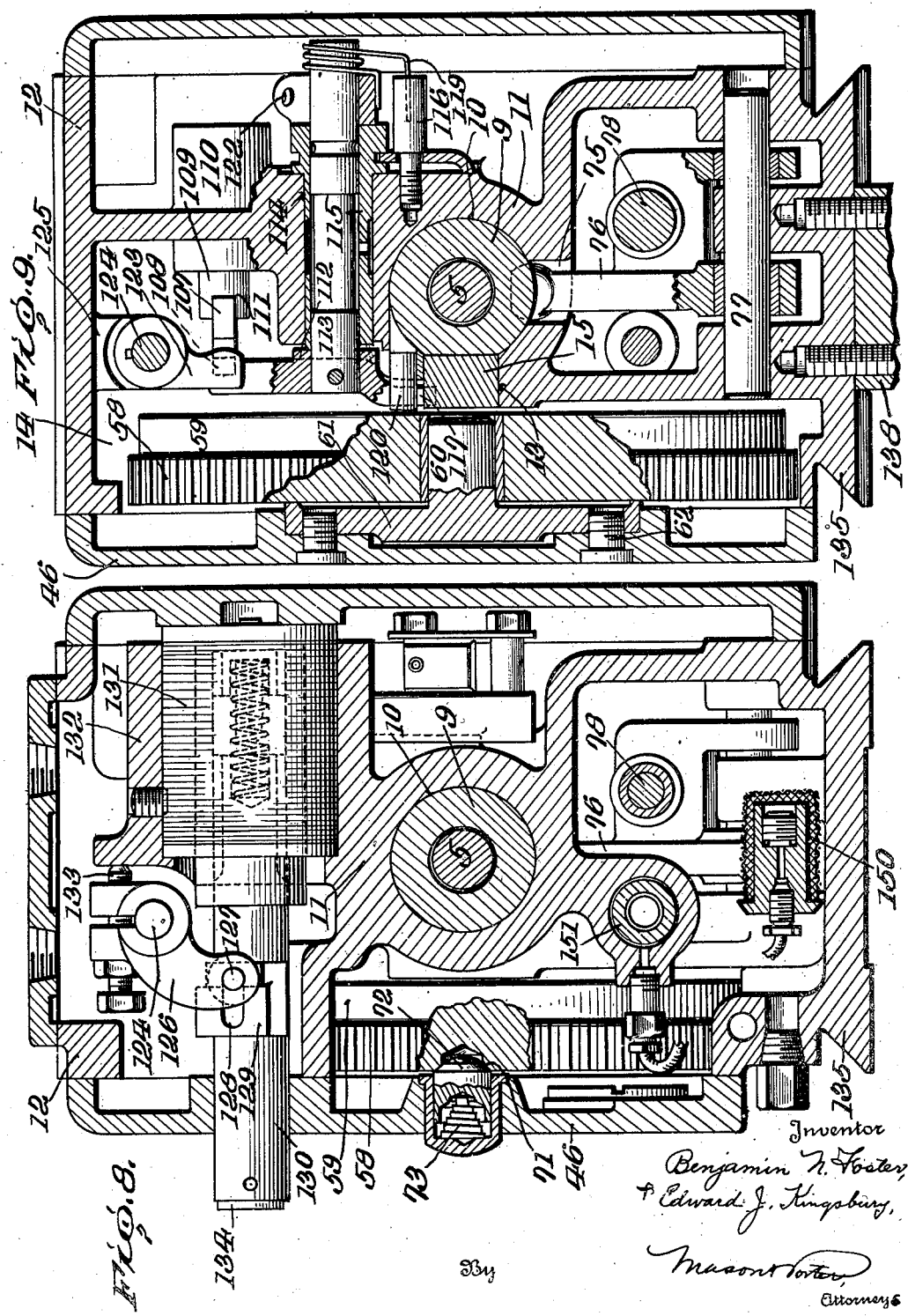
Inventor
Benjamin N. Foster,
& Edward J. Kingsbury,
By Mason Porter
Attorneys July 25, 1939.  B. N. FOSTER ET AL  2,167,401
MACHINE TOOL WITH FEEDING MECHANISM
Filed Jan. 6, 1937  11 Sheets-Sheet 6
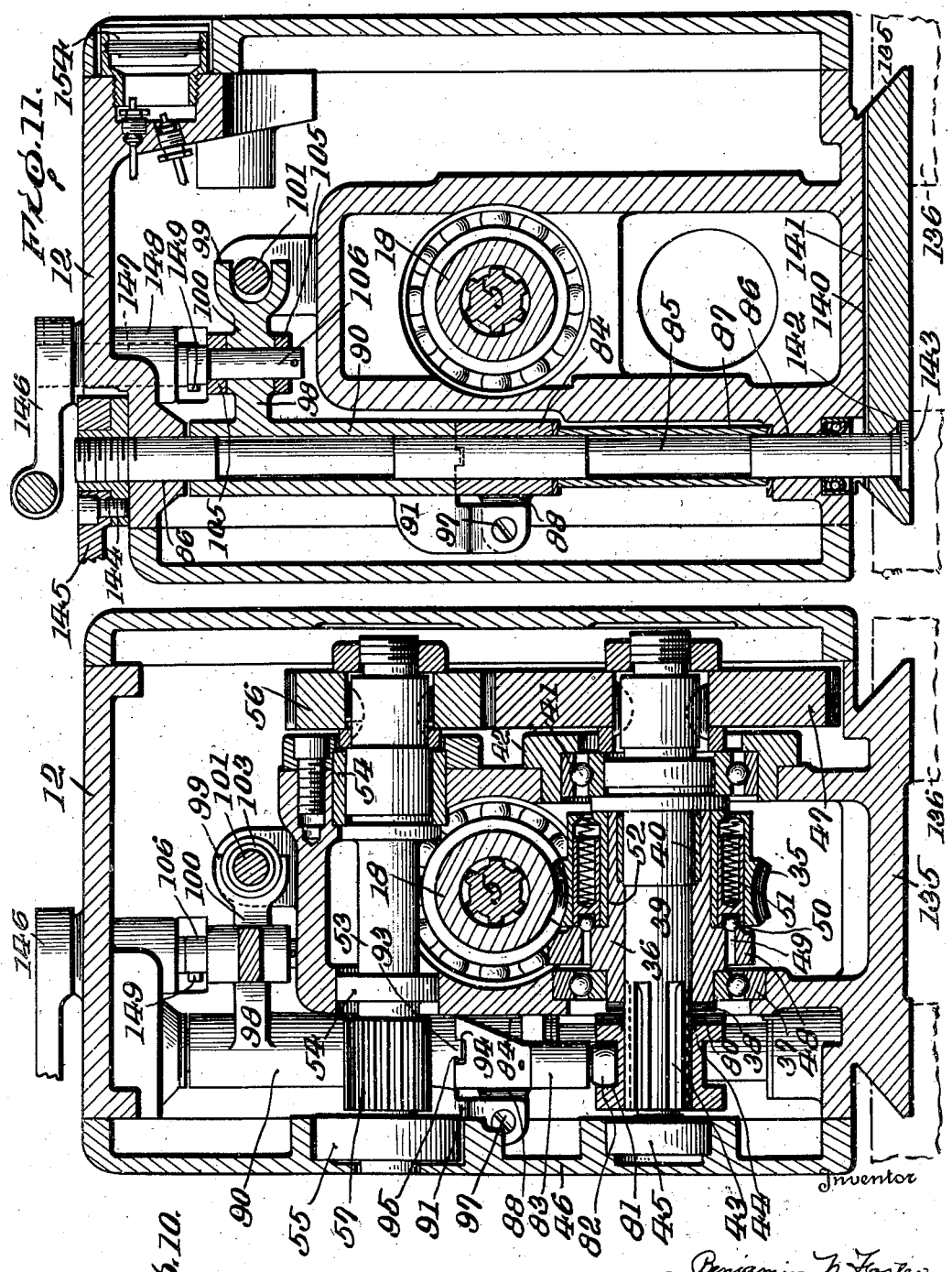
Inventor
Benjamin N. Foster,
Edward J. Kingsbury,
By Mason & Porter
Attorneys.

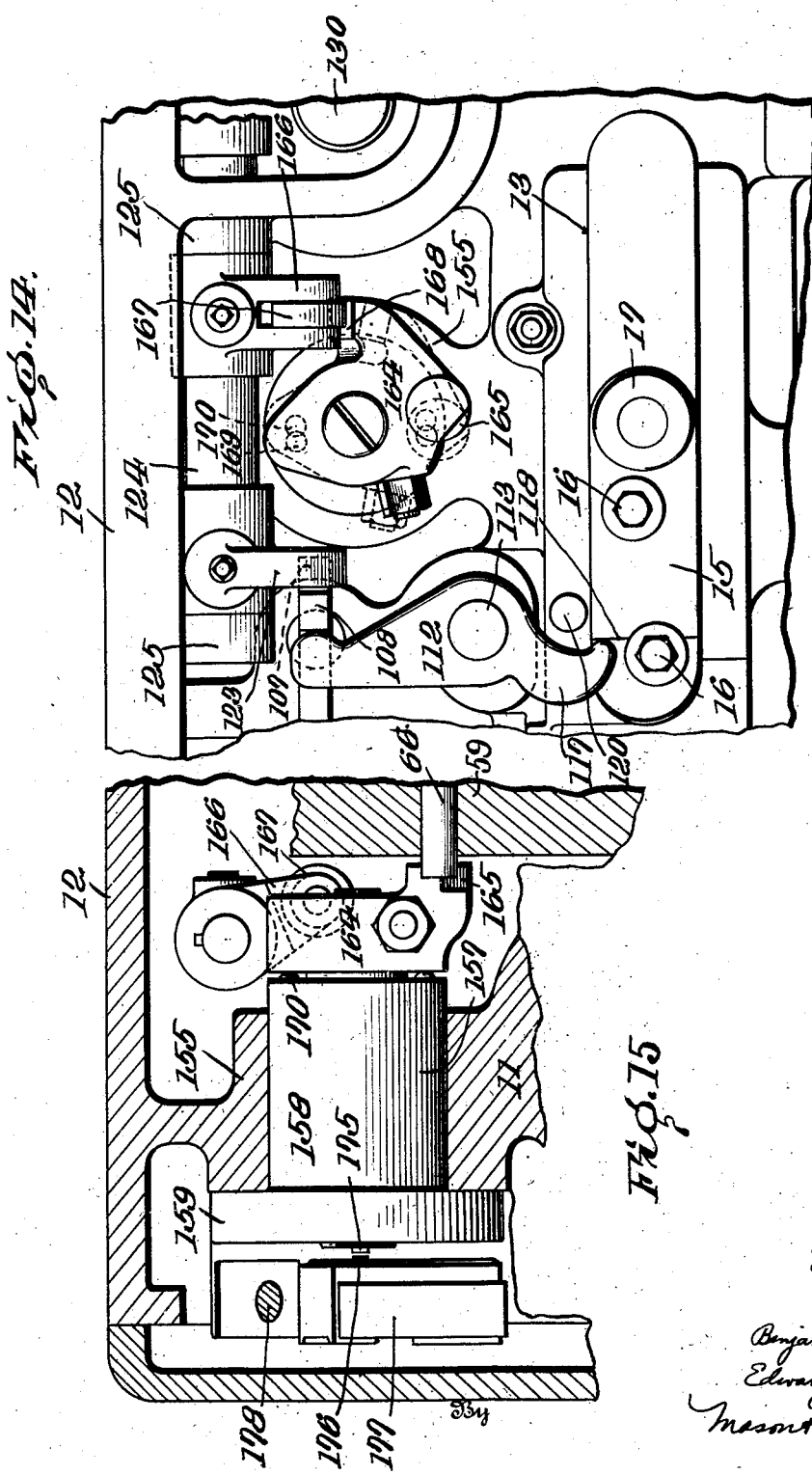

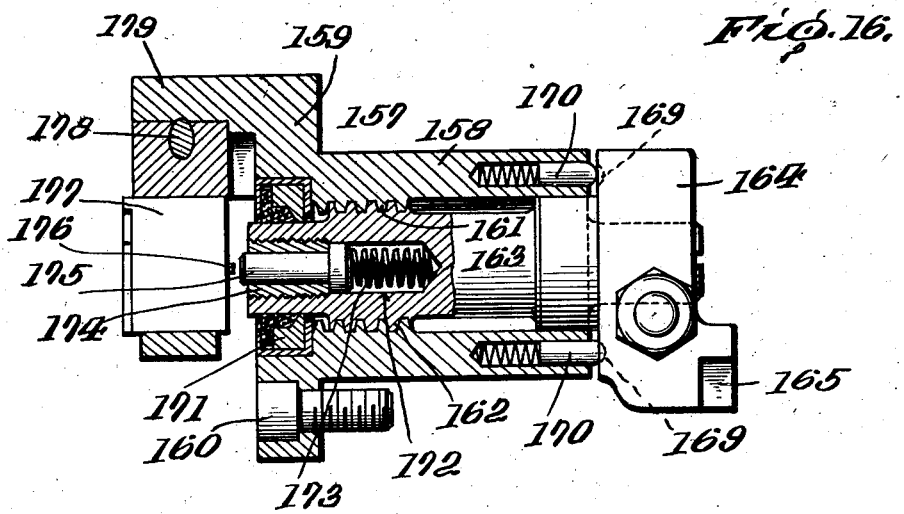

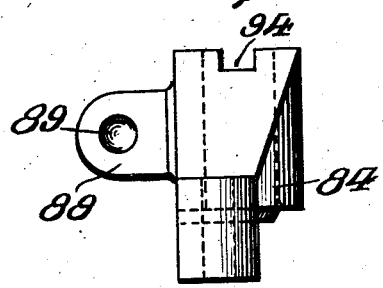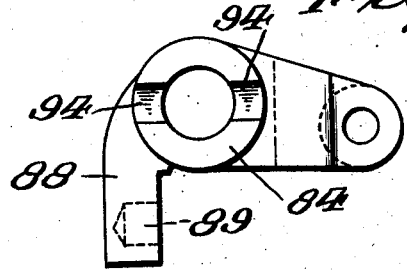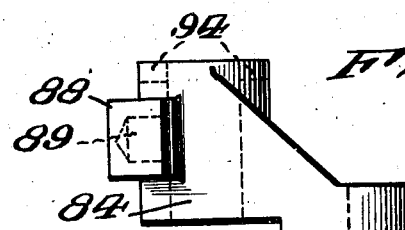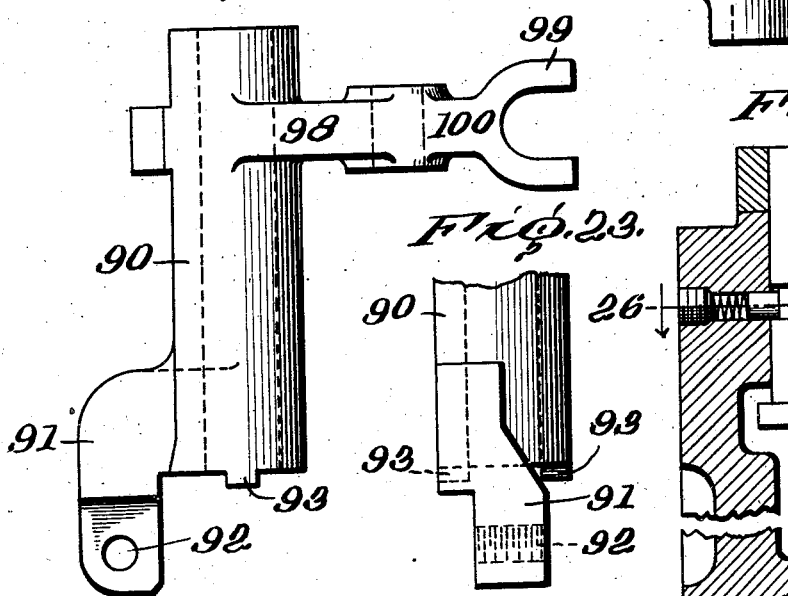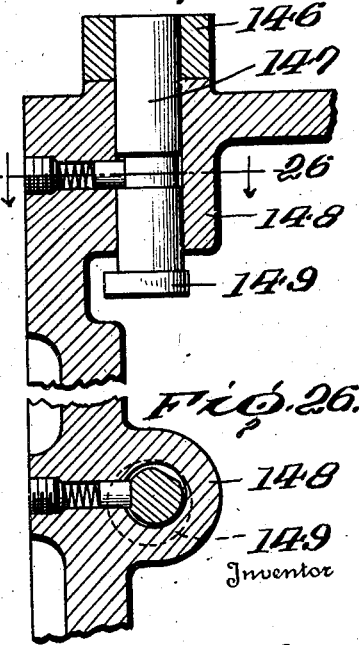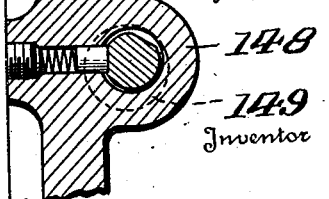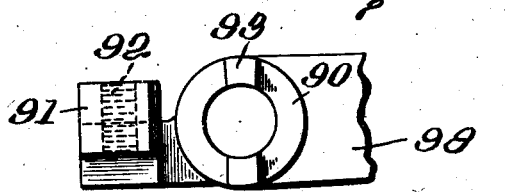

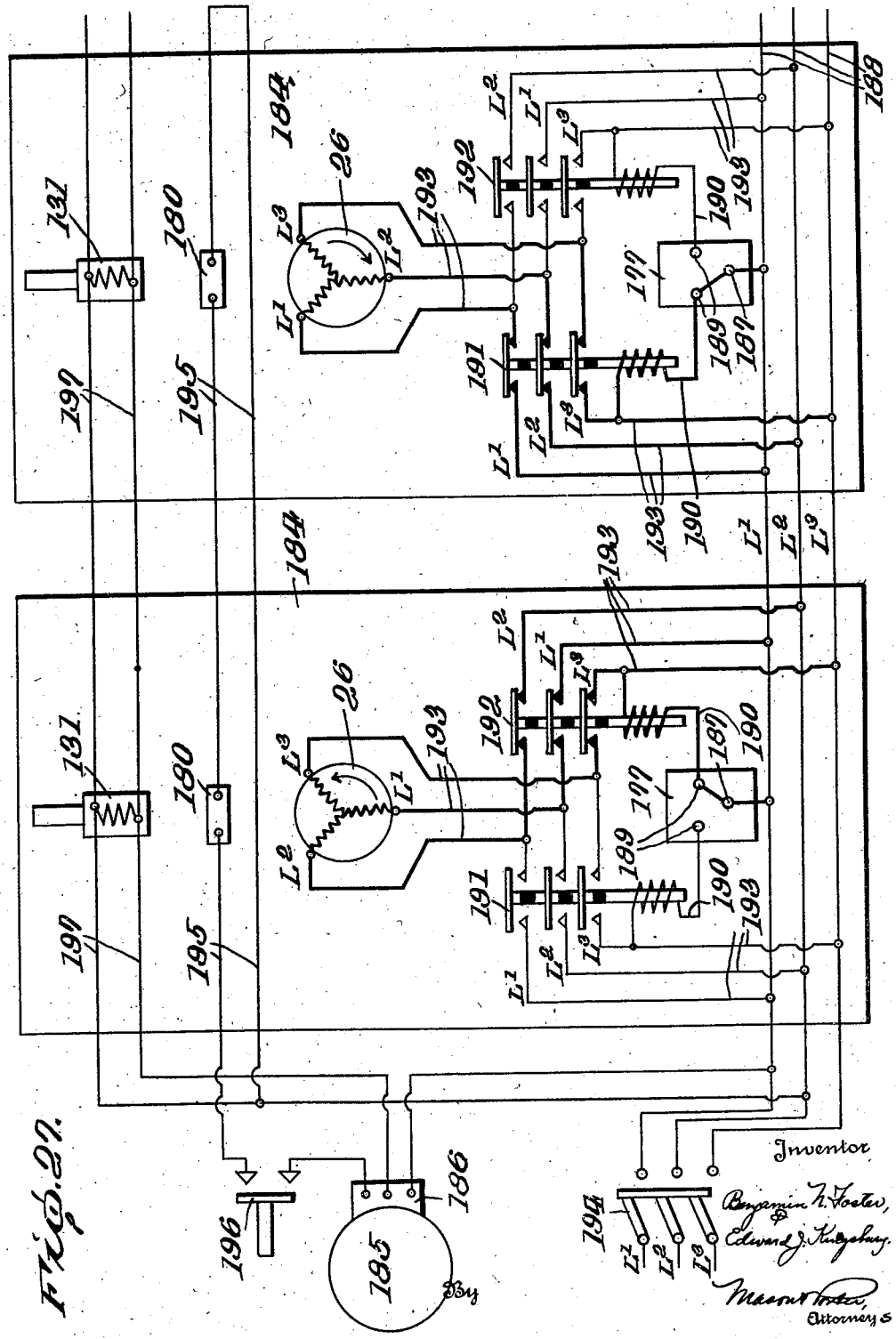

Patented July 25, 1939

2,167,401

UNITED STATES PATENT OFFICE 2,167,401

MACHINE TOOL WITH FEEDING MECHANISM

Benjamin Norton Foster and Edward Joslin Kingsbury, Keene, N. H., assignors to Kingsbury Machine Tool Corporation, Keene, N. H., a corporation of New Hampshire Application January 6, 1937, Serial No. 119,336

32 Claims. (Cl. 10—130)

The invention relates generally to metal working machines of the type wherein are employed a supporting table, a plurality of work heads mounted on the table and each including means for acting upon a work piece, and indexing mechanism effective to present the work piece or pieces serially to the work heads; and said invention primarily seeks to provide a head more compact and efficient in operation than those heretofore known.

While our improved head is adapted to use in ordinary drilling, or other metal working functions, it is particularly designed for tapping. In machines of this character the various mechanisms customarily are electric motor driven and the tapper spindle motor is constantly connected to the spindle and also to the means for moving the spindle toward and from the work, and the motor must be brought to rest at the completion of each tapping cycle. It will be evident that in each such operating cycle the respective head motor will be subjected to three current surges, first, when the motor is started up from rest, second, when plugged from forward to reverse in order to retract the tapper tool, and third, when plugged from reverse to a standstill. The longevity of motors thus operated is materially reduced by the unnecessary amount of strain and heat generation naturally resulting from each operation.

It is an object of the invention, therefore, to provide a novel tapper head in which the driving motor continuously operates and is connected continuously with the spindle but is disconnected from the means for moving the spindle toward and from the work between tapping cycles, control means also being provided for causing the spindle to rotate in reverse between tapping cycles, for connecting the motor in driving relation with the spindle projecting and retracting means at the beginning of each tapping cycle and for disconnecting it upon completion of each such cycle, and for reversing the direction of rotation of the spindle at the beginning of the cycle and at the completion of the forward stroke of the tapper. By this mode of operation the continuously rotating motor maintains a cooler condition and is subjected to only two current surges during each operating cycle, namely, first when the motor is plugged from reverse to forward, and second when the motor is plugged from forward to reverse at the end of the forward or projection stroke of the tapper.

Another object of the invention is to provide a work head in which are provided, novel compactly arranged power transmitting connections including clutching devices for engaging and disengaging the spindle projecting and retracting means, novel latching devices automatically or manually operable for controlling the clutching devices, and novel means for assuring complete disengagement of the clutching devices upon completion of each tapping cycle.

Another object of the invention is to provide novel means for manually disengaging the clutch at any time desired.

With these and other objects in view that will hereinafter appear, the invention further resides in the novel details of construction, combination and arrangement of parts, all of which will be first fully described in the following detailed description, and then be particularly pointed out in the appended claims, reference being had to the accompanying drawings.

In the drawings:—

Figure 3 is a left side elevation, the left side cover plates being removed.

Figure 4 is a front elevation.

Figure 5 is a vertical, central longitudinal section, portions of the head supporting table and a position adjusting screw also being shown.

Figures 6 and 7 are horizontal sections taken respectively on the lines 6—6 and 7—7 on Figure 5.

Figure 2:
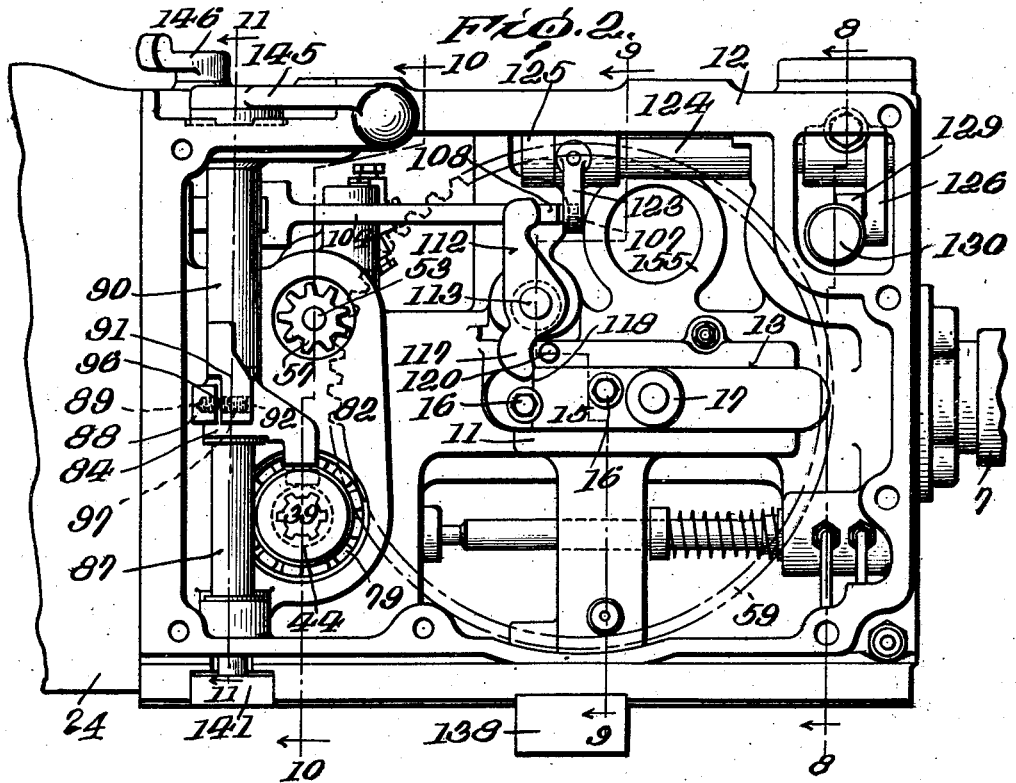
Figure 2 is a right side elevation, the cam cover plate and the cam mounted thereon being removed.
Figure 1:
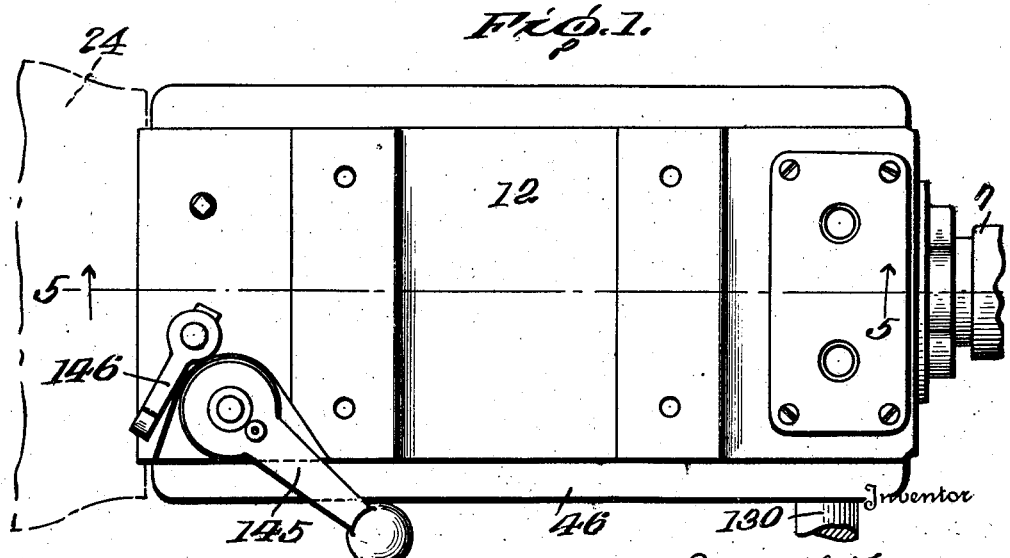
Figure 1 is a plan view of a head embodying the invention, a portion only of the motor being shown.

Figures 8, 9, 10 and 11 are vertical cross sections taken respectively on the lines 8—8, 9—9, 10—10 and 11—11 on Figure 2.

Figure 12:
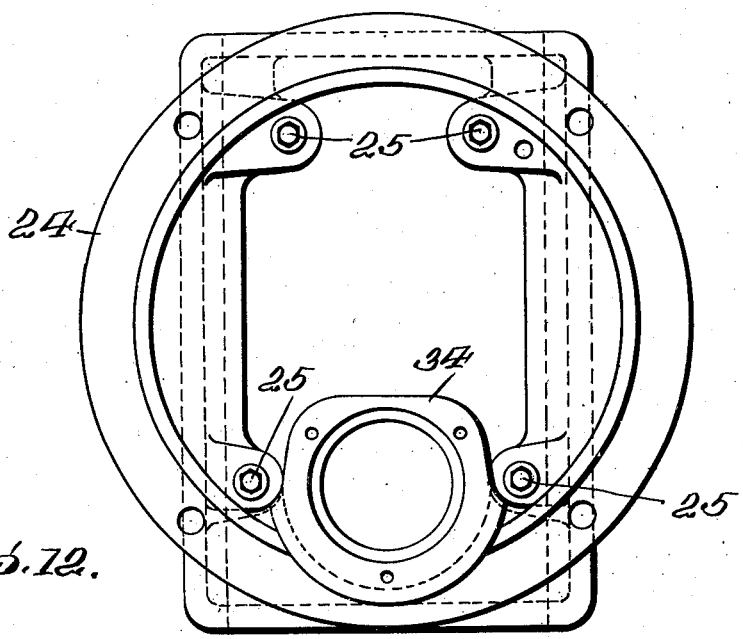

Figure 12 is a rear end view of the auxiliary casing body member.

Figure 13:
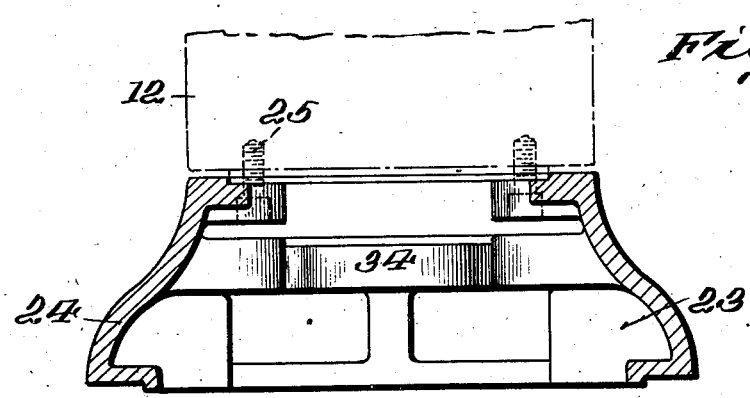

Figure 13 is a horizontal section of the member shown in Figure 12.

Figure 14 is an enlarged fragmentary right side elevation illustrating the pilot or reversing switch actuating mechanism.

Figure 15 is a detail vertical cross section of the actuating mechanism shown in Figure 14.

Figure 16 is a detail central longitudinal section of the removable pilot or reversing switch control unit per se.

Figure 17 is a face view of the cam employed in the head when operating as a tapper head.

Figure 18 is a face view of the cam employed in the head when operating as a drill head.

Figure 19 is a front elevation of the clutch crank sleeve member per se.

Figure 20 is a right side elevation, and Figure 21 a plan view of the member shown in Figure 19.

Figure 22 is a front elevation of the clutch actuator sleeve per se.

Figure 23 is a right side elevation of the lower end of the actuator sleeve.

Figure 24 is an inverted plan view of the sleeve portion shown in Figure 23.

Figure 25 is a detail vertical section illustrating the manually actuated clutch releasing lever.

Figure 26 is a detail horizontal section taken on the line 26—26 on Figure 25.

Figure 27 is a diagrammatic view illustrating one manner in which the control equipments of the head may be electrically connected in cooperative relation and with a power source.

Figure 28 is a diagrammatic plan view illustrating a plurality of heads disposed in spaced relation about and in cooperative relation with a work indexing table.

In the drawings in which like numerals of reference indicate like parts in all of the figures, 5 designates the spindle which is equipped with the usual tool socket 6 in which is mounted the tapper, drill bit, or other metal working tool. The spindle is rotatably supported at its front end in a ball bearing 7 and at its rear end in sleeve bearing 8, both bearings being mounted in the quill 9. The quill 9 is longitudinally slidable in a bore or guideway 10 provided therefor in a central web portion 11 of the head casing or body 12. The body 12 is of suitable skeleton shell form so as to provide such wall, web and bearing portions as are necessary to house and support the various mechanisms of the head, and suitable wall openings through which the mechanisms are accessible. See Figures 2, 3 and 5 through 11.

A longitudinal slideway 13 is provided in the web portion 11 and laterally of this slideway the casing body is shaped to provide a cam chamber 14. A key block 15, secured as at 16 to the quill, is slidable in the slideway 13, and a cam roller 17 is affixed to the key block and projects laterally into the cam chamber 14 for a purpose that will become apparent as the description progresses. See Figures 2, 9 and 14.

At the rear end thereof, the spindle is surrounded by a drive sleeve 18. The sleeve is spline connected at 19 to the spindle and is rotatable in ball bearings 20 suitably supported in the casing body as shown in Figure 5. A worm 21 is formed integrally upon the sleeve, for a purpose later to be described, and a gear 22 is keyed upon the rear end of the sleeve, through which gear rotation is imparted to the sleeve and the spindle with which it is spline-connected.

The gear 22 projects rearwardly beyond the casing body proper into a gear chamber 23 provided in the auxiliary casing member 24 secured as at 25 to the rear end of said casing body. See Figures 5, 6, 7, 12 and 13. The casing member 24 is interposed between the main casing body and the reversible motor unit 26, the latter being secured to the rear end of said casing member as at 27. Upon the end of the drive shaft 28 of the motor which projects into the gear chamber 23 is mounted a small driver gear, and from this gear the rotation of the motor shaft is transmitted to the reduction gears 29 and 30 secured upon the jack shaft 31 rotatable in the bearings 32 and 33 provided in the rear wall of the main casing body and in the upstanding web 34 of the casing member 24 respectively. The reduction gear 30 being in mesh with the spindle gear 22, the sleeve 18 and spindle 5 will be caused to rotate whenever the driving motor 26 is energized.

The parts thus far described serve to impart rotation to the spindle, and this rotation is to be considered as normally continuous. In other words, rotation of the spindle is not discontinued between operating cycles but is continuous except when the machine is shut down. When the invention is applied to a simple drill head the continuous rotation is forward or clockwise, but when the head is being used for tapping purposes the continuous, or normal between cycle rotation is reverse or counterclockwise, as will be described later. We will now proceed to describe the devices by which movements of the quill toward and from the work, or in other words projection and retraction of the quill, are accomplished.

A worm wheel 35 is enmeshed with and has rotation imparted thereto by the sleeve worm 21. The worm wheel is normally freely rotatable with the sleeve 36 rotatably supported in a ball bearing 37 mounted in a casing body web wall. A clutch face 38 is formed on the right end of the sleeve and the sleeve surrounds a driver shaft 39 upon which it has sleeve bearing as at 40, the shaft being in turn rotatably supported in a ball bearing 41 provided in a gland 42 mounted in a casing body web wall opening as shown in Figure 10.

At its right end the shaft 39 has spline connection at 43 with a clutch member 44 and is rotatably supported in a ball bearing 45 mounted on the removable cover plate 46 through which access can be had to the cam chamber 14. A driver gear 47 is keyed to the opposite end of said shaft.

An overload clutch flange 48 is formed on the sleeve 36 and has a plurality of recesses or ball seats 49 engaged by balls 50 urged against said seats by spring plunger equipments 51 carried by the worm wheel 35. Thus, under all normal loads, the worm wheel 35 and sleeve 36 will rotate together, but upon the imposition of any overload the balls 50 will ride out of their accommodating seats, allowing the worm wheel to rotate independently of the sleeve 36 upon its bearing thereon at 52. See Figure 10.

A cam drive shaft 53 is rotatably supported transversely of the casing body in bearings provided therefor at 54 in said casing body and at 55 in the cover plate 46. A pinion 56 keyed at the left end of the shaft meshes with the driver pinion 47, and at its other end the shaft carries a small cam driver pinion 57 which meshes with the rim gear 58 formed on the quill projecting and retracting cam 59. The cam is rotatably supported on a stud shaft 60 projecting from a supporting plate 61 removably secured to the cam chamber cover plate 46 as indicated at 62. See Figures 10 and 9.

As previously stated my improved work head, preferably employed for tapping, may be used for other purposes, such as drilling and reaming. In making such adaptations it is only necessary to substitute cams and make other minor changes. The need for such changes will be obvious. For example, when drilling, the tool can be continuously rotated in a clockwise direction, during actual drilling and also during projection toward and retraction from the work, whereas in tapping the direction of rotation of the tapper must be reversed upon completion of the tapping operation in order to back it out of the work.

When the head is set up as a tapper a cam such as is shown in Figure 17 is mounted on the cover stud 60. This cam is provided with a groove or recess into which the roller 17 projects and which includes a dwell portion 63 in which the roller rests when the quill is fully retracted, a rapid approach and return effecting portion 64, a slow tapper feed and return portion 65, and a motor reversing pin 66 the purpose of which will be described later. This cam obviously does not make complete revolutions, as does the driller cam, but is rotated approximately 180° in one direction to project and infeed the tapper and then reversed to outfeed and retract the tapper.

A cam adapted for drilling is shown in Figure 18 and includes a dwell 67 at the retraction point, a rapid approach portion 68, a slow infeed portion 69, and a rapid return portion 70. This cam rotates in one direction only, it being unnecessary to reverse the direction of rotation of the drill bit.

Any cam used is provided with a stop recess 71 to receive a bullet nosed stop pin 72 carried by the cover plate 46 and which is yieldably pressed into the receiving recess by a spring 73 each time these parts come into registering relation upon completion of an operating cycle to yieldably hold the respective cam pending commencement of movement incident to the next succeeding operative cycle.

It will be noted that in the tapper head cam shown in Figure 17 the feed and return controlling portion does not take the form of a two walled grooveway, a full clearance 74 being provided outwardly of the cam wall portion 65. In this manner breakage is avoided which would otherwise occur should the relation of tapper pitch angle and the speeds of rotation of spindle and longitudinal movement of quill at times not exactly synchronize. The quill 9 is provided with a recess 75 in which the free end of a return arm 76 engages. The arm is pivoted at 77 in casing body web portions and is engaged by a spring plunger equipment 78 constantly urging it toward the fully retracted position shown in Figure 5. See also Figures 7 and 9.

The clutch thimble 44 hereinbefore broadly mentioned is spline-connected upon the right end of the shaft 39 and is equipped with a clutch face 80 engageable with the clutch face 38 formed on the adjacent end of the sleeve 36. This thimble also has an annular grooveway 81. A clutch shifting roller 82 projects into the grooveway and is carried on a crank arm 83 extending forwardly from a sleeve member 84 which is freely rockable about the pintle 85, the latter being supported in casing body bearing portions 86 and extending above and below the casing body proper for a purpose soon to be described.

A supporting sleeve 87 surrounds the pintle 85 beneath the rocker sleeve 84, and the sleeve 84 includes a laterally extended ear 88 having a spring seat or recess 89. An actuator sleeve 90 surrounds the pintle above the sleeve 84, and this sleeve rests upon and is rockable with the sleeve 84.

The actuator sleeve carries an ear 91 projected laterally into position for opposing the ear 88 of the sleeve 84 and equipped with a spring seat or recess 92 for cooperating with the seat 89 in the ear 88. It is desired that the sleeves 90 and 84 should move together in effecting clutching and declutching functions, but also that they should have a limited degree of relative movement effective always to assure complete disengagement of the clutch faces 38 and 80 upon completion of a declutching operation. In order to accomplish this the sleeve 90 is equipped with depending cross lugs 93 engaging in cross grooves 94 in the sleeve 84, opposite faces of the lugs 93 being reduced at 95 to provide groove clearances which permit the relative movement referred to. See Figures 2, 6, 7, 10, 11 and 19 to 24.

A compression spring 96 is mounted in the opposed ear recesses 89 and 92 and the latter preferably is in the nature of a threaded bore fitted with a closure plug 97 thus facilitating the mounting and conditioning of the spring.

It will be obvious that each time the sleeves 90 and 84 are rocked in the clockwise direction, as viewed in Figure 6, the ear 91 of the former will engage the ear 88 of the latter compressing or loading the interposed spring 96 and moving the thimble 44 to disengage the clutch faces 38 and 80. As soon as the friction incident to clutch tooth engagement is relieved by complete disengagement, the loaded spring will fire and kick the thimble over the additional distance permitted by the lug and groove clearances thus assuring definite spacing of the clutch teeth as shown in Figure 10.

At its upper end the actuator sleeve 90 is equipped with a crank arm 98 terminating in a bifurcated end 99 and having a vertically bored boss 100 intermediate its ends. The arm end 99 straddles a pin 101 removably supported at 102 in wall portions of the casing body and is opposed by a compression spring 103 surrounding the pin between the arm end and one of the wall portions. The spring 103 constantly tends to move the crank arm in a direction for engaging the clutch faces 80 and 38 in the manner hereinbefore explained. Thus the spring constitutes the effective clutching force, and the functioning of the spring is controlled by a novel latching mechanism which we will now proceed to describe.

A clutch release latch or hook member 104 is disposed horizontally within the casing body and has its rear end bifurcated at 105 to straddle the boss 100 of the crank arm 98 to which it is pivotally connected as at 106. At its front end the member includes a trip end extension 107 and a latch hook or nose 108. The front or free end of the member is urged toward the right, or in the direction in which the element 108 projects, by a spring plunger 109 mounted in a casing body boss 110, and the plunger is slotted as at 111 to form a seat or slide bearing for said member. See Figures 2, 6 and 9.

In order to secure the member 104 in position for holding the clutch members disengaged, and provide for the resetting of this member after it has been tripped or released to permit the spring 103 to bring about clutch member engagement, we provide a latch lever 112. This lever is disposed in a generally vertical position and is secured intermediate its ends upon a pivot shaft 113 rockably supported in an eccentric bore 114 in a sleeve 115 removably secured as at 116 in a cross bore formed in the casing body web portion 11. See Figure 9.

The lower end 117 of the lever 112 extends into position for being engaged by an abutment shoulder 118 on the quill key block 15 each time the parts assume their normal, at rest or after cycle position, as shown in Figure 2. It will be observed that the upper end of the lever lies behind the latch hook 108, and it will be obvious that when the parts are positioned as shown in Figure 2, contact of elements 118, 117, 112, 108, 104, 106, and 99 will hold the clutch faces disengaged against the urge of the loaded spring 103. It will also be obvious that movement of the quill key block shoulder 118 to the rear during retraction of the quill will rock the lever 112 in a direction for moving with it the previously tripped member 104 and storing energy in the spring, and simultaneously effecting disengagement of the clutch faces in a manner hereinbefore described.

In order to trip or release the latching devices it is necessary to move the member 104 laterally toward the left to release the hook 108 from the lever 112 and permit said member to move rearwardly under the urge of the loaded spring 103. As soon as this release is effected clutch engagement takes place and the cam starts rotating, causing the quill projection to commence. A spring 119 may be provided and mounted as shown in Figure 9 so as to move the upper end of the lever 112 rearwardly as soon as pressure is relieved at the lower end 117 by forward movement of the quill key block shoulder 118, thus repositioning the upper lever end behind the latch hook 108 so that it will effect a resetting of the latch and restoration of the spring energy when the shoulder 118 returns to engagement with the lever end 117 at the completion of the cycle as above described. Movement of the lever 112 under urge of the spring 119 is limited by the pin 120 projecting laterally from the casing body web portion 11 as shown in Figures 2 and 9.

By adjustment of the sleeve 115 about its axis, the position in space of the pivot shaft 113, the lever 112 and the member 104 can be altered to slightly vary the time at which the clutch faces 38 and 80 are disengaged. This adjustment, properly made, times the clutch disengagement to occur just as the spring latch member 72 is on the verge of entering the cam recess 71.

A switch actuating lever 121 is adjustably secured as at 122 on the outer end of the shaft 113 and serves to close a switch, for a purpose later to be described, each time the quill is fully retracted at the completion of an operating cycle. During all other positions of the quill the lever 121 is removed from its switch closing position by the spring 119 which functions as previously described. The lever 121 is adjustably mounted on the outer end of the shaft 113 so that it can be readjusted to proper switch contacting relation following any adjustment of the eccentric bushing 115 which might be made. See Figures 3 and 9.

For tripping or releasing the latch member 104 we provide a trip arm 123 secured upon one end of a trip shaft 124 rockable in suitable casing body bearings 125, said arm depending from the shaft in position for engaging the trip end extension 107 of the member whenever the shaft is rocked in the proper direction, as shown in Figures 2 and 9. A trip lever 126 is secured upon the other end of the shaft 124 and carries a pin 127 projecting into a horizontal slot 128 in a slide block 129 vertically slidable in an accommodating groove in the spring-projected-electrical-energy retracted core 130 of a solenoid 131 removably secured in the mounting boss 132 formed in the casing body. An adjustable stop 133 carried by the lever 126, limits rocking movement of the shaft 124 and determines the at rest position of the arm 123. See Figure 8. The solenoid core extends out of the casing body through a suitable opening provided in the cover plate 46 and is equipped with a push button end 134 by which it can be manually actuated to effect a rocking of the shaft 124 to release the latching devices and initiate an operating cycle. It will be obvious also that each time the solenoid 131 is energized the same tripping function will occur, and by reason of the pin and slot equipment 127, 128 this tripping is accomplished by a sharp hammer blow. The solenoid functions during normal automatic operation of the machine upon which my improved head is mounted.

It is thought to be unnecessary to explain in greater detail the structure of the solenoid. Any suitable structure may be employed, and an example of one such structure is disclosed in the patent to B. N. Foster, 1,987,555 issued January 8, 1935.

Each casing body 12 preferably includes a dovetail base portion 135 for slidably engaging receiving grooveways 136 formed in the machine table generally designated 137 and upon which it is customary to mount a plurality of such heads for progressive operations upon a work piece or pieces. Obviously the work steps may be accomplished by advancing the table step-by-step with relation to the work, but preferably the work is indexed with relation to the head tools which are adapted to work upon it.

Pressures encountered during operation of heads of this character are so great that no infinitely variable adjustment of the quill seems to prove entirely satisfactory for any length of time. We, therefore, eliminate quill adjustment and make provision for adjusting the entire head by means of the thread block 138 depending from the head, and a captive screw 139 which engages the block as indicated in Figure 5. The bottom face of the casing body is provided with a cross groove 140 in which is mounted a clamp block 141. This block has a bore, through which the lower end of the pintle 85 projects, and a non-circular seat 142 for a head 143 formed on said pintle. The upper end of the pintle is threaded and carries a flanged nut 144 to which a clamp lever 145 is affixed. See Figure 11. By properly manipulating the crank 145 the block 141 may be drawn upwardly in the grooveway 140 to grip in the table grooveway 136 and clamp the head at its adjusted position.

A clutch release lever 146 is secured upon a pin 147 pivoted in and extending vertically through the casing body bearing boss 148. At its lower end the pin carries a cam head 149 which may be moved into engagement with the pivot pin 106 for moving the latch member 104 forwardly and effecting disengagement of the clutch faces 38 and 80 at any time desired. See Figures 11 and 26.

Any suitable lubricating system may be employed to properly lubricate the moving parts within the head. We have generally indicated a screen protected inlet 150 (Fig. 8) for taking lubricant from a sump in the lower portion of the casing body and directing it to the pump, generally designated 151 (Fig. 7), the spring returned plunger of which is projected by an eccentric cam surface 152 formed in the overload clutch disk 48 with which said plunger contacts as shown in Figure 7. Suitable distributer lines 153 deliver lubricant from the pump to the various moving parts needing lubrication, and a sight window unit 154 may be provided for conveniently checking the operation of the lubricating system.

The parts thus far described are common to all of our improved heads, and when used in conjunction with a drill bit for simple drilling purposes these parts comprise a complete operating entity. In this use the motor starts in the forward direction of rotation upon throwing in of the main switch, and continues so to rotate until the machine is shut down. Thus the spindle rotates continuously but the quill advancing and retracting means functions only when the latching devices are tripped, manually or automatically, and are automatically disconnected from the continuously running motor or power source upon completion of each cycle of operation.

We will now proceed to describe the minor changes or adjustments which are made to adapt the improved head for tapping operation, also the index controlling devices which prevent indexing except when all quills are fully retracted and which can be employed on all improved heads or not at all as desired.

As has been previously explained, when the heads are to be set up for tapping purposes, the quill movement controlling cam shown in Figure 17 is substituted for the cam previously mounted on the stud pin 60. It will be noted by reference to Figure 6 that the casing body includes a bored mounting boss 155 which is closed by a removable cover plate 156 when the head is set up for drilling. This cover plate is now removed and a pilot or reversing switch control unit generally designated 157 is mounted in the boss 155. See Figures 2, 3, 6 and 15.

The control unit 157 is shown in detail in Figure 16 of the drawings and includes a sleeve casing portion 158 receivable in the boss bore, and a head flange 159 which is secured at 160 to said boss. The casing portion 158 is equipped with quick pitch internal threads 161 engaged by the external threads 162 formed on the contact making and breaking or circuit selecting element 163 rotatably mounted in the sleeve and projecting from the inner end thereof. Upon its inner end the element 163 carries an actuating lever 164 faced at 165 to be engaged by the cam pin 66 hereinbefore referred to.

To the trip shaft 124 previously described is added a crank arm 166 carrying a roller 167 engageable each time the clutching devices are tripped by rocking of the shaft 124 with a faced crank portion 168 of the arm 164 for imparting partial rotation to the element 163. The thread pitch is such that only about ten degrees of movement of the element in one direction or the other about its axis will suffice to make or break contact, or rather select the reversing circuits in a manner soon to be described. Movement of the element in a direction for rendering effective the forward rotation controlling circuit is imparted by the roller 167, and reverse movement for rendering effective the reverse rotation controlling circuit is imparted by the cam pin 66. See Figures 14 and 15. Recesses or seats 169 are formed in the member 166 for receiving the spring pins 170 projecting from the inner end of the sleeve 158, and the seats are suitably positioned so that these equipments will yieldably hold the crank arm 166 in one or the other of its two operative positions.

A suitable packing 171 surrounds the outer end of the element 163 and this end is equipped with an axial bore 172 in which is mounted a compression spring 173. The outer end of the bore is internally threaded and fitted with a sleeve bushing 174 through which extends a headed plunger pin 175 yieldably projected by the spring 173. When the carrying element 163 is moved as hereinbefore described, the plunger 175 is moved into or out of engagement with the circuit selecting plunger 176 of a Burgess type double contact switch 177 removably secured at 178 to a flange extension 179 of the unit head. A switch of this type is disclosed in U. S. Letters Patent 1,960,020 but it is to be understood that any suitable form of switch may be employed. This type of switch includes a single contact constantly connected with a power source, two spaced contacts each connected to a control circuit or wiring, and a circuit completing element spring biased toward one of the spaced contacts and adapted to be moved against the other of the spaced contacts by the plungers 175 and 176. The contact arrangement of the switch 177 is diagrammatically shown in Figure 27 which will soon be referred to in detail.

When the arm 121 is employed to prevent indexing except when all quills have been fully retracted following operating cycles, it cooperates with a single contact switch 180, and the switches of the several units are connected in series with the indexing mechanism as shown in U. S. patent to Kingsbury 1,975,008 issued September 25, 1934. The switch is removably secured upon the casing body as at 181 and the lever 121 has a spring plunger 182 for engaging the plunger 183 of the switch, it being understood that when the plunger 183 is depressed a circuit is completed through the switch, and when this pressure is released the circuit is broken.

It is to be understood that any suitable form of motor and reversing control circuit arrangement may be employed. In Figure 27 we have diagrammatically illustrated one manner of connecting and controlling the tapper units or heads. A suitable indexing mechanism and control means therefor are disclosed in U. S. patent to Kingsbury 1,975,008 issued September 25, 1934.

In the diagrammatic illustration in Figure 27, the tapper heads or units are indicated at 184, the turret table at 185, and the turret table indexing control at 186. Each of the heads includes a reversible motor 26, a latch mechanism tripping solenoid 131, a pilot or reversing switch 177, and an index controlling switch 180. The single contact 187 of each pilot switch 177 is constantly connected with a power source which in this illustration takes the form of one of the lines of a three phase power supply line 188. The spaced contacts 189 of each switch 177 are individually associated through wiring 190, selective relays 191 and 192 and wiring 193 with the reversible motor 26, the phase relation of the power line and connecting wirings being indicated at L1, L2 and L3. A master switch is indicated at 194. The index controlling switches 180 of the heads may be connected in series, as at 195, through the index controlling means diagrammatically indicated at 186, a hand switch being interposed as at 196, and the solenoids 131 may be connected in multiple, as at 197, through the same means.

Obviously the tapper heads will not always operate in perfect synchronism, some will encounter greater resistance than others and require a longer interval of time in which to complete a tapping cycle. Thus in the diagrammatic illustration in Figure 27 we have shown the two pilot switches 177 in different control positions, the one at the left as having been reversed upon completion of the forward stroke of the quill to cause the cam to retract the quill and tapper, and the one at the right as remaining in the position controlling projection of the quill and tapper indicating that in this unit the tapper has not as yet completed the tapping function. The forward phase relation is shown by heavy lines in the right hand unit, and the reversed phase relation is similarly shown in the left hand unit.

In Figure 28 we have supplemented the diagrammatic illustration in Figure 27 with a diagrammatic plan illustration of a plurality of head units 184 and their driving motor attachments 26 disposed in spaced relation about and in cooperative relation with a work indexing table 185. As has been previously stated, the indexing mechanism may be of any approved form, and since an example of such mechanism is fully disclosed in U. S. Patent to Kingsbury 1,975,008, issued September 25, 1934, further detailed description of an indexing means is thought to be unnecessary herein.

*Operation*

In describing the operation of a machine embodying a plurality of our improved tapper heads, a turret table and indexing means for presenting the work pieces serially to the heads, and controls arranged as diagrammatically illustrated in Figure 27, it will be assumed that all of the head quills are at their fully retracted positions and that the master switch 194 and the hand switch 196 are both open.

By now throwing in or closing the master switch 194 the motors 26 on all of the heads will be started and will impart rotation to the spindles to which they are respectively connected in reverse or counter-clockwise direction, the pilot switches 177 being positioned as on the head 184 shown at the left of Figure 27.

The latching devices of any particular head may be manually tripped to set in motion the quill actuating cam by pressing inwardly on the particular solenoid core button 134 as previously described, but it is preferred that this tripping function should be accomplished electrically, and that the operating cycles thus initiated should be automatically repeated so long as normal operating conditions maintain. By closing the hand switch 196, a circuit is completed through the indexing mechanism and a single step movement of the turret table is effected. Upon completion of this movement of the turret table, the solenoids 131 will be collectively energized and all latching devices will thus be tripped simultaneously. A description of the action which now takes place in one of the heads will suffice for all.

As the core 130 of the solenoid 131 is drawn in, the end of the slot 128 forcibly contacts the pin 127, rocking the trip lever 126 and shaft 124 to which it is affixed, and causing the trip arm 123 to engage the end extension 107 of the member 104 and move it to right as viewed in Figure 9, or upwardly as viewed in Figure 6. This movement releases the latch hook 108 from the latch lever 112 and permits the loaded spring 103 to rock the sleeves 90 and 84 and bring about clutching engagement of the clutch faces 80 and 38.

When the shaft 124 is rocked as above related, the crank arm 166 mounted thereon as shown in Figure 14 will trip the pilot switch actuating lever 164 and adjust the control unit 175 to shift the switch 177 from the position shown on the left hand head unit 184 of Figure 27 to that shown on the right hand unit, thus shifting the phase relation in the power input lines 193 and changing the direction of rotation of the motor shaft 28 and spindle 5, from normal reverse or counter-clockwise to forward or clockwise. Thus the same trip rocking of the shaft 124, effected either manually or by energization of the solenoid, serves both to throw in the clutch and to reverse the direction of rotation of the spindle 5.

With the clutch now thrown in, and the spindle rotating properly for the infeeding of the tapper, the rotation of the shaft 39, imparted to it from the motor shaft 28 through gears 29, 30; 22, 21, 35 and clutch elements 36 and 44, will be transmitted through gears 47, 56 and 57 to the quill actuating cam 59. See Figures 2, 5, 10 and 17. Rotation of the cam 59 will impart and control projecting and retracting movement of the quill 9, projection and retraction of the quill toward and from the work piece taking place rapidly, and the infeeding and outfeeding of the tapper taking place slowly.

When the cam 59 has rotated about 180°, or an amount sufficient to have completed the infeeding of the tapper to the intended depth in the work piece, the cam pin 66 will strike the face 165 of the pilot switch actuating lever 164 and readjust the control unit 157 to bring about a shifting of the switch 177 from its present position back to that illustrated on the unit 184 at the left of Figure 27, thus again shifting the phase relation in the power input lines 193 and changing the direction of rotation of the spindle 5 and also that of the cam 59 to bring about, first the slow outfeeding, and then the rapid retraction of the tapper. See Figures 14 and 15.

As the quill 9 initially moved forwardly, the key block shoulder 118 moved away from the lower end of the latch lever 112 and permitted the spring 119 to move said end against the stop pin 120, thus rocking the shaft 113 and breaking the contact of the switching plungers 182, 183 (see Figure 3) and resetting the upper end of the lever behind the latch hook 108. Obviously the series circuit through the head unit switches 180 was thus broken and indexing of the turret table cannot take place until this circuit is again completed by the return of the quills of all the units to their fully retracted positions.

Upon the return of each quill to the fully retracted position shown in Figures 2 and 5, the respective key block shoulder 118 again engages the lower end of the latch lever 112 and restores the lever to the position shown in Figures 2, 6 and 14, reloading the spring 103 and disengaging the clutch faces 80, 38, and also reengaging the index controlling switch contacts by repositioning the parts as shown in Figure 3. Movement of the cam 59 is thus discontinued, but the spindle 5 continues to rotate in the reverse or counter clockwise direction.

When all of the head units have completed their operating cycles, assuming, of course, that the hand switch 196 has been left closed, an indexing of the turret table 185 will take place and the solenoids 131 will thereafter be collectively energized to initiate a repetition of the cycle above described. The details of one means for controlling and effecting the indexing is disclosed in U. S. patent to Kingsbury, 1,975,008 issued September 25, 1934. Should the hand switch be open, a momentary closure of it will initiate an indexing and a working cycle. The mechanism is thus adapted to fully automatic or semi-automatic operation by simple control of the hand switch 196.

Engagement of the clutch faces 80, 38 of a given head unit can be effected manually by pressing the particular solenoid core button 134, and these faces can be manually disengaged at any time by manipulation of the hand lever 146 as previously described.

It is of course to be understood that the details of construction and arrangement of parts may be variously changed without departing from the spirit and scope of our invention.

What we claim is:

1. In apparatus of the class described, the combination of a tool carrying spindle, a quill in which the spindle is rotatably mounted, a motor, a cam directly connected with the quill for controlling reciprocation thereof, means actuated by said motor for rotating the spindle and the cam, said last named means including a clutch engageable and disengageable to initiate and discontinue cam rotation without disturbing the continuity of rotation of said spindle, and means for automatically actuating the clutch to alternately engage and disengage it to cause the apparatus to perform successive operating cycles.

2. In apparatus of the class described, the combination of a tool carrying spindle, a quill in which the spindle is rotatably mounted, a motor, a cam directly connected with the quill for controlling reciprocation thereof, means actuated by said motor for rotating the spindle and the cam, said last named means including a clutch engageable and disengageable to initiate and discontinue cam rotation without disturbing the continuity of rotation of said spindle, means for automatically actuating the clutch to alternately engage and disengage it to cause the apparatus to perform successive operating cycles, and manually operable means enabling disengagement of the clutch at any time.

3. In apparatus of the class described, the combination of a tool carrying spindle, a quill in which the spindle is rotatably mounted, a motor, a cam directly connected with the quill for controlling reciprocation thereof, means actuated by said motor for rotating the spindle and the cam, said last named means including a clutch engageable and disengageable to initiate and discontinue cam rotation without disturbing the continuity of rotation of said spindle, and means for automatically actuating the clutch to alternately engage and disengage it to cause the apparatus to perform successive operating cycles, said last named means including a part manually operable to bring about clutch actuation without disturbing the automatic control.

4. In apparatus of the class described, the combination of a casing body, a quill reciprocable in and projecting from said body, a spindle rotatable in and projecting from said quill, a motor, means for continuously driving the spindle from the motor, quill reciprocating means, automatically operable means including a clutch and actuating devices for controlling operation of the reciprocating means through successive cycles, said last named means including a part manually operable to bring about clutch actuation without disturbing the automatic control, and a pivoted lever operable from without the casing body and including a cam head located within said body and engageable with said clutch actuating devices for disengaging the clutch devices at any time.

5. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, means for tripping the latching devices to initiate a quill reciprocation, means for disengaging the clutch and resetting the latching devices and reloading said spring means upon completion of each quill reciprocation, and load and fire spring means associated with said clutch actuating lever member and effective upon each clutch disengagement to separate the clutching faces an additional distance for assuring against undesired contact.

6. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, and means for tripping the latching devices to initiate a quill reciprocation, said last named means including a trip lever having a pin projecting therefrom and a solenoid the core of which is equipped with a longitudinal slot into which said pin projects and effective to cause said core to impart to the trip lever a hammer blow at each tripping function.

7. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, means for tripping the latching devices to initiate a quill reciprocation and means for disengaging the clutch and resetting the latching devices and reloading said spring means upon completion of each quill reciprocation, said lever member including separable sleeve portions each having an ear presented in opposition to the ear of the other sleeve, a load and fire spring interposed between said ears, and means permitting a limited degree of relative movement of said sleeve portions for purposes described.

8. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, means for tripping the latching devices to initiate a quill reciprocation, means for disengaging the clutch and resetting the latching devices and reloading said spring means upon completion of each quill reciprocation, said lever member including separable sleeve portions each having an ear presented in opposition to the ear of the other sleeve, a load and fire spring interposed between said ears, means permitting a limited degree of relative movement of said sleeve portions, a pintle supported in and extending from said casing body and upon which the sleeve portions of said lever member are pivoted, means for adjustably supporting said head, and means associated with said pintle for clamping said head at adjusted positions.

9. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, and means for tripping the latching devices to initiate a quill reciprocation, said latching devices including a latch lever pivoted intermediate its ends and engageable at one end with the quill at the inner terminus of its path of reciprocation, a latch member connected to said lever member and having a hook portion engaging said latch lever for maintaining a loaded condition of the spring and a trip end extension, and a rockable trip arm engageable with said end extension for releasing said hook portion from engagement with said latch lever.

10. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, and means for tripping the latching devices to initiate a quill reciprocation, said latching devices including a latch lever pivoted intermediate its ends and engageable at one end with the quill at the inner terminus of its path of reciprocation, a latch member connected to said lever member and having a hook portion engaging said latch lever for maintaining a loaded condition of the spring and a trip end extension, a rockable trip arm engageable with said end extension for releasing said hook portion from engagement with said latch lever, and means for rocking said trip arm including a solenoid having a core adapted to be manually or electrically actuated.

11. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, and means for tripping the latching devices to initiate a quill reciprocation, said latching devices including a latch lever pivoted intermediate its ends and engageable at one end with the quill at the inner terminus of its path of reciprocation, a latch member connected to said lever member and having a hook portion engaging said latch lever for maintaining a loaded condition of the spring and a trip end extension, a rockable trip arm engageable with said end extension for releasing said hook portion from engagement with said latch lever, and a switch actuating arm movable with said latch lever.

12. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing poistion, and means for tripping the latching devices to initiate a quill reciprocation, said latching devices including a latch lever pivoted intermediate its ends and engageable at one end with the quill at the inner terminus of its path of reciprocation, a latch member connected to said lever member and having a hook portion engaging said latch lever for maintaining a loaded condition of the spring and a trip end extension, a rockable trip arm engageable with said end extension for releasing said hook portion from engagement with said latch lever, and spring means for moving the latch lever into resetting relation to said hook portion whenever the quill and the latch lever are out of contact.

13. In apparatus of the character described wherein is provided a casing body, a motor, a spindle driven by the motor, a quill, and means including a shiftable clutch for initiating and discontinuing reciprocations of said quill; clutch controlling means comprising a pivotally mounted clutch actuating lever member, spring means normally tending to move the said lever member to effect engagement of the clutch, latching devices for holding the lever member in the clutch releasing position, means for tripping the latching devices to initiate a quill reciprocation, and a sleeve bearing eccentrically bored to receive the said lever member pivot and movable for adjusting the position of the said lever member to vary the timing of the clutch action.

14. In apparatus of the character described wherein is provided a casing body, a motor, a spindle driven by the motor, a quill, and means including a shiftable clutch for initiating and discontinuing reciprocations of said quill; clutch controlling means comprising a clutch actuating lever member, spring means normally tending to move the lever to engage the clutch, latching devices for holding the lever in the clutch releasing position, and means for tripping the latching devices to initiate a quill reciprocation, said latching devices including a latch lever pivoted intermediate its ends and engageable at one end with the quill at the inner terminus of its path of reciprocation, a latch member connected to said lever member and having a hook portion engaging said latch lever for maintaining a loaded condition of the spring and a trip end extension, a rockable trip arm engageable with said end extension for releasing said hook portion from engagement with said latch lever, and a spring plunger urging said latch member toward said latch lever and forming a slide bearing for said latch member.

15. In a tapper head, the combination of a tapper tool carrying spindle, a quill in which the spindle is rotatably mounted, quill reciprocating means, a continuously operating motor for rotating the spindle throughout successive cycles, means driven by the motor for actuating the reciprocating means, means additional to said means for connecting and disconnecting the motor in driving relation with the reciprocating means and additional means for reversing the direction of rotation of the spindle upon initiation of each tapping cycle and for again reversing the direction of rotation of the spindle upon completion of the infeeding of the tapper tool into the work.

16. In a tapper head, the combination of a tapper tool carrying spindle, a quill in which the spindle is rotatably mounted, a motor, a cam directly connected with the quill for controlling reciprocation thereof, means for continuously connecting the motor in driving relation with the spindle throughout successive cycles, and means additional to the first means controlled through the driving of the spindle for connecting and disconnecting the motor in driving relation with the cam and additional means for reversing the direction of rotation of the motor upon the initiation of each tapping cycle.

17. In a tapper head, the combination of a tapper tool carrying spindle, a quill in which the spindle is rotatably mounted, a motor, a cam directly connected with the quill for controlling reciprocation thereof, means for continuously connecting the motor in driving relation with the spindle throughout successive cycles, means additional to the last mentioned means and in driven relation therewith for connecting and disconnecting the motor in driving relation with the cam and additional means for reversing the direction of rotation of the motor upon the initiation of each tapping cycle and for again reversing the direction of rotation of the motor upon completion of the infeeding of the tapper tool.

18. In a tapper head, the combination of a tapper tool carrying spindle, a quill in which the spindle is rotatably mounted, a motor, a cam directly connected with the quill for controlling reciprocation thereof, means for continuously connecting the motor in driving relation with the spindle, means for connecting the motor in driving relation with the cam and for reversing the direction of rotation of the motor upon the initiation of each tapping cycle, means for again reversing the direction of rotation of the motor upon completion of the infeeding of the tapper tool, and means for discontinuing operation of the cam upon completion of each tapping cycle while permitting said spindle to rotate.

19. In a tapper head, the combination of a tapper tool carrying spindle, a quill in which the spindle is rotatably mounted, a motor, quill reciprocating means, means for continuously connecting the motor in driving relation with the spindle, means including a clutch and actuating devices therefor for connecting the reciprocating means and the motor in operative relation for initiating a tapping cycle, and means operable by movement of the clutch actuating devices for reversing the direction of rotation of the motor.

20. In a tapper head, the combination of a tapper tool carrying spindle, a quill in which the spindle is rotatably mounted, a motor, quill reciprocating means, means for continuously connecting the motor in driving relation with the spindle, means including a clutch and actuating devices therefor for connecting the reciprocating means and the motor in operative relation for initiating a tapping cycle, means operable by movement of the clutch actuating devices for reversing the direction of rotation of the motor, means operable upon completion of the projection stroke of reciprocation of the quill for again reversing the direction of rotation of the motor, and means engageable with the clutch actuating devices for releasing the clutch upon completion of a tapping cycle.

21. In a tapper head, the combination of a tapper tool carrying spindle, a quill in which the spindle is rotatably mounted, a motor, quill reciprocating means, means for continuously connecting the motor in driving relation with the spindle, means including a clutch and actuating devices therefor for connecting the reciprocating means and the motor in operative relation for initiating a tapping cycle, means operable by movement of the clutch actuating devices for reversing the direction of rotation of the motor, means operable upon completion of the projection stroke of reciprocation of the quill for again reversing the direction of rotation of the motor, and means effective upon completion of a tapping cycle for releasing the clutch to discontinue quill movement while permitting said spindle to continue its rotation.

22. In a tapper head, the combination of a tapper tool carrying spindle, a quill in which the spindle is rotatably mounted, a motor, a rotary cam directly connected with the quill for controlling reciprocation thereof, means for continuously connecting the motor in driving relation with the spindle, means including a latch controlled loaded spring actuated clutch and latch tripping devices for connecting the cam and the motor in operative relation to initiate a tapping cycle, and means operable by movement of said tripping devices for reversing the direction of rotation of the motor.

23. In a tapper head, the combination of a tapper tool carrying spindle, a quill in which the spindle is rotatably mounted, a motor, a rotary cam directly connected with the quill for controlling reciprocation thereof, means for continuously connecting the motor in driving relation with the spindle, means including a latch controlled loaded spring actuated clutch and latch tripping devices for connecting the cam and the motor in operative relation to initiate a tapping cycle, means operable by movement of said tripping devices for reversing the direction of rotation of the motor, means operable upon completion of the projection stroke of reciprocation of the quill for again reversing the direction of rotation of the motor; and means actuated by return of the quill upon completion of a tapping cycle for releasing the clutch, reloading the spring and restoring the controlling latch.

24. In a tapper head, the combination of a tapper tool carrying spindle, a quill in which the spindle is rotatably mounted, a motor, a rotary cam directly connected with the quill for controlling reciprocation thereof, means for continuously connecting the motor in driving relation with the spindle, means including a latch controlled loaded spring actuated clutch and latch tripping devices for connecting the cam and the motor in operative relation to initiate a tapping cycle, a reversing pin projecting from said cam, and motor reversing means including a pilot switch and a control unit therefor actuated by said tripping devices to reverse the motor operation to a forward rotation upon initiation of the tapping cycle and actuated by said cam pin upon completion of the projection stroke of the quill to reverse the motor to a reverse rotation.

25. In a tapper head, the combination of a tapper tool carrying spindle, a quill in which the spindle is rotatably mounted, a motor, a rotary cam directly connected with the quill for controlling reciprocation thereof, means for continuously connecting the motor in driving relation with the spindle, means including a latch controlled loaded spring actuated clutch and latch tripping devices for connecting the cam and the motor in operative relation to initiate a tapping cycle, a reversing pin projecting from said cam, motor reversing means including a pilot switch and a control unit therefor actuated by said tripping devices to reverse the motor operation to a forward rotation upon limitation of the tapping cycle and actuated by said cam pin upon completion of the projection stroke of the quill to reverse the motor to a reverse rotation; and means actuated by return of the quill upon completion of its retraction stroke for releasing the clutch, reloading the spring and restoring the controlling latch.

26. In a tapper head, the combination of a tapper tool carrying spindle, a quill in which the spindle is rotatably mounted, a motor, quill reciprocating means, means for continuously connecting the motor in driving relation with the spindle, means including a clutch and actuating devices therefor for connecting the reciprocating means and the motor in operative relation for initiating a tapping cycle, a motor reversing pilot switch having a first position for effecting forward rotation and a second position for effecting reverse rotation, a switch control unit comprising an internally threaded sleeve, an externally threaded rotor operable in and projecting from the sleeve for cooperation with said switch, and an actuating lever on said rotor movable in one direction by a part of said clutch actuating devices and in the other direction by a part of said quill reciprocating means for controlling attainment of said first and second positions in said switch.

27. In a machine of the character described, the combination of a supporting table; a plurality of tapper heads mounted on said table; work piece supporting means; indexing means operable to bring about relative movement between said heads and said work piece to serially correlate said piece and heads; each said head comprising a tapper tool carrying spindle, a quill in which the spindle is rotatably mounted, quill reciprocating means, and a motor for rotating the spindle and for actuating the reciprocating means; means for simultaneously connecting the motors in driving relation with the several reciprocating means and for reversing the direction of rotation of the several spindles to initiate a tapping cycle; and means for individually reversing the direction of rotation of the spindles in the respective heads as the infeeding of each tapper tool is completed.

28. In a machine of the character described, the combination of a supporting table; a plurality of tapper heads mounted on said table; work piece supporting means; indexing means operable to bring about relative movement between said heads and said work piece to serially correlate said piece and heads; each said head comprising a tapper tool carrying spindle, a quill in which the spindle is rotatably mounted, quill reciprocating means, and a motor for rotating the spindle and for actuating the reciprocating means; means for simultaneously connecting the motors in driving relation with the several reciprocating means and for reversing the direction of rotation of the several spindles to initiate a tapping cycle; means for individually reversing the direction of rotation of the spindles in the respective heads as the infeeding of each tapper tool is completed; and means in each head for discontinuing operation of its quill reciprocating means upon completion of the tapping cycle of the head without discontinuing rotation of the spindle of said head.

29. In a machine of the character described, the combination of a supporting table; a plurality of tapper heads mounted on said table; work piece supporting means; indexing means operable to bring about relative movement between said heads and said work piece to serially correlate said piece and heads; each said head comprising a tapper tool carrying spindle, a quill in which the spindle is rotatably mounted, quill reciprocating means, and a motor for rotating the spindle and for actuating the reciprocating means; means for simultaneously connecting the motors in driving relation with the several reciprocating means and for reversing the direction of rotation of the several spindles to initiate a tapping cycle; means for individually reversing the direction of rotation of the spindles in the respective heads as the infeeding of each tapper tool is completed; means in each head for discontinuing operation of its quill reciprocating means upon completion of the tapping cycle of the head without discontinuing rotation of the spindle of each head; means for manually initiating a tapping cycle in any selected head; and means for manually interrupting a tapping cycle in any selected head.

30. In a machine of the character described, the combination of a supporting table; a plurality of tapper heads mounted on said table; work piece supporting means; indexing means operable to bring about relative movement between said heads and said work piece to serially correlate said piece and heads; each said head comprising a tapper tool carrying spindle, a quill in which the spindle is rotatably mounted, quill reciprocating means, and a motor for rotating the spindle and for actuating the reciprocating means; means for simultaneously connecting the motors in driving relation with the several reciprocating means and for reversing the direction of rotation of the several spindles to initiate a tapping cycle; means for individually reversing the direction of rotation of the spindles in the respective heads as the infeeding of each tapper tool is completed; means in each head for discontinuing operation of its quill reciprocating means upon completion of the tapping cycle of the head without discontinuing rotation of the spindle of each head; and means for preventing indexing until the tapping cycles have been completed in all of the heads.

31. In a tapper head, the combination of a tapper tool carrying spindle, a quill in which the spindle is rotatably mounted and having a roller projecting laterally therefrom, a cam directly engaging said roller for controlling reciprocation of said quill, means for continuously connecting the motor in driving relation with the spindle, means for connecting the motor in driving relation with the cam and for reversing the direction of rotation of the motor upon the initiation of each tapping cycle, means for again reversing the direction of rotation of the motor upon completion of the infeeding of the tapper tool, means for discontinuing operation of the cam upon completion of each tapping cycle while permitting said spindle to continue rotating, said cam having a grooveway for receiving said roller and shaped to effect rapid projection of the tool toward and from the work and a shoulder portion bordered by a peripheral clearance considerably wider than the diameter of the roller, said shoulder portion being shaped to control slow infeeding of the tool into and outfeeding of the tool from the work, and spring means for yieldably holding said roller against said shoulder portion.

32. In a tapper head, the combination of a tapper tool carrying spindle, a quill in which the spindle is rotatably mounted, a motor, quill reciprocating means, means for continuously connecting the motor in driving relation with the devices therefor for connecting the reciprocating means and the motor in operative relation for initiating a tapping cycle, means operable as an incident to the initiation of a tapping cycle for reversing the direction of rotation of the motor, means operable upon completion of the projection stroke of reciprocation of the quill for again reversing the direction of rotation of the motor, and means effective upon completion of a tapping cycle for releasing the clutch to discontinue quill movement while permitting said spindle to continue its rotation.

BENJAMIN NORTON FOSTER.
EDWARD JOSLIN KINGSBURY.